(12) United States Patent
Stickles

(10) Patent No.: US 11,230,173 B2
(45) Date of Patent: Jan. 25, 2022

(54) MAGNETIC HEADER DESIGN

(71) Applicant: Bestop, Inc., Louisville, CO (US)

(72) Inventor: George C. Stickles, Thornton, CO (US)

(73) Assignee: BESTOP, INC, Louisville, CO (US)

( * ) Notice: Subject to any disclaimer, the term of this patent is extended or adjusted under 35 U.S.C. 154(b) by 50 days.

(21) Appl. No.: 16/793,687

(22) Filed: Feb. 18, 2020

(65) Prior Publication Data

US 2020/0262280 A1     Aug. 20, 2020

Related U.S. Application Data

(60) Provisional application No. 62/807,088, filed on Feb. 18, 2019.

(51) Int. Cl.
| | |
|---|---|
| *B60J 10/38* | (2016.01) |
| *B60J 7/185* | (2006.01) |
| *B60J 7/16* | (2006.01) |
| *B60J 7/00* | (2006.01) |
| *B60J 10/90* | (2016.01) |

(52) U.S. Cl.
CPC ........... *B60J 7/1851* (2013.01); *B60J 7/0007* (2013.01); *B60J 7/1657* (2013.01); *B60J 10/38* (2016.02); *B60J 10/90* (2016.02)

(58) Field of Classification Search
CPC ...... B60J 7/1851; B60J 7/0007; B60J 7/1657; B60J 10/38; B60J 10/90
USPC ......................................................... 296/97.8
See application file for complete search history.

(56) References Cited

U.S. PATENT DOCUMENTS

| | | | |
|---|---|---|---|
| 9,950,598 B2* | 4/2018 | Stickles | B60J 7/1291 |
| 2007/0069186 A1* | 3/2007 | Alocilja | H01B 1/128 |
| | | | 252/500 |
| 2012/0234509 A1* | 9/2012 | Harris | B60J 1/2011 |
| | | | 160/369 |
| 2019/0344647 A1* | 11/2019 | Matras | B60J 7/104 |
| 2020/0055380 A1* | 2/2020 | Dexter | B60J 7/10 |

* cited by examiner

*Primary Examiner* — Hilary L Gutman
(74) *Attorney, Agent, or Firm* — Warn Partners, P.C.

(57) ABSTRACT

A vehicle arrangement is provided including a vehicle body having at least a partially open top and transverse window with a ferromagnetic frame, a flexible membrane sunscreen cover for at least a portion of the vehicle. A magnetic member connected with the sunscreen cover holds an end of the cover with the window frame.

15 Claims, 5 Drawing Sheets

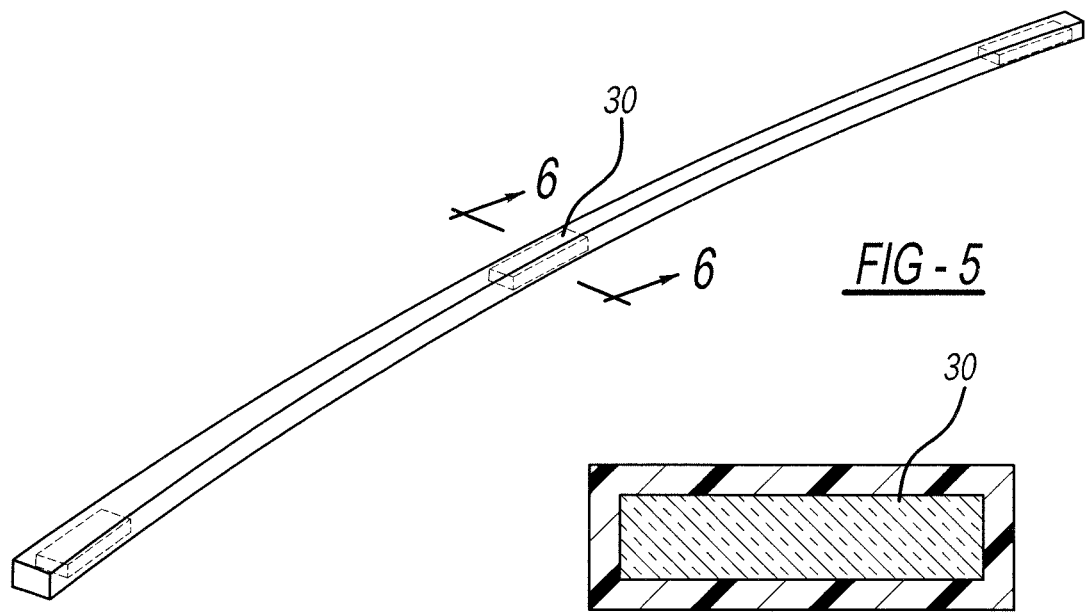
FIG - 5
FIG - 6
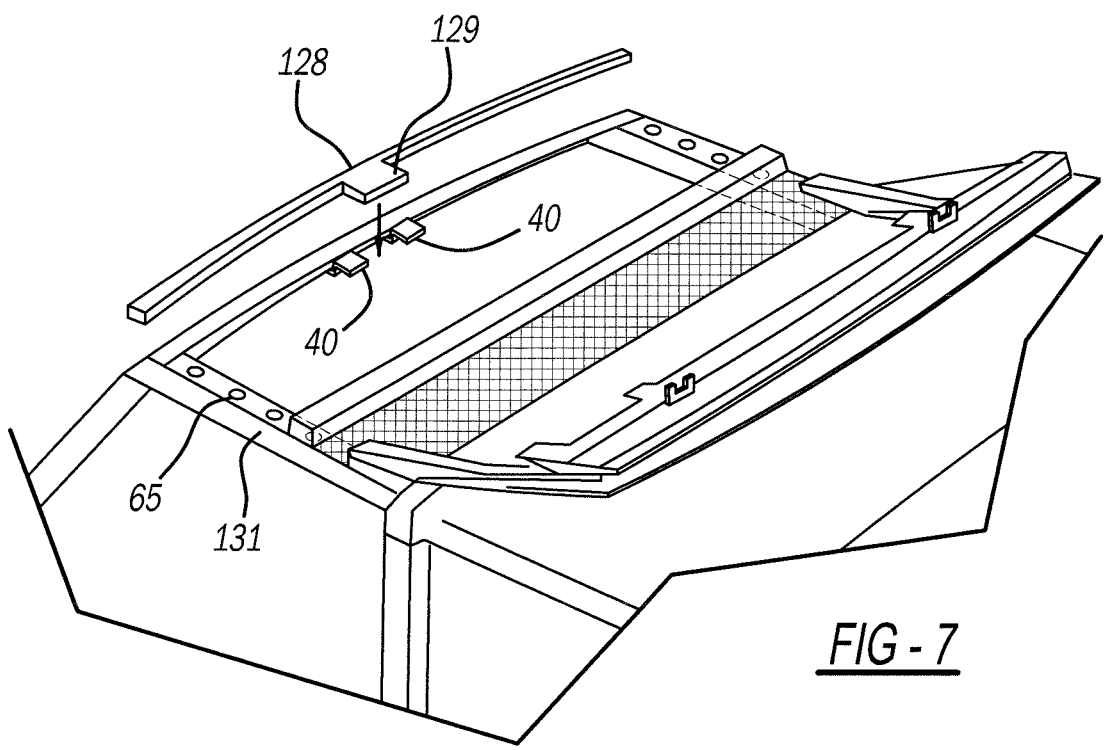
FIG - 7

MAGNETIC HEADER DESIGN

FIELD OF THE INVENTION

The present invention relates to a sun shade or sun bikini top for a Jeep-type or SUV-type vehicle. Typically such tops are stored under a more permanent softer hard top.

BACKGROUND OF THE INVENTION

Many sport utility vehicles, especially Jeep-type vehicles, can have a top that can be removed to allow the occupant to enjoy the open air. Unfortunately, such exposure provides more exposure to the harsh sunlight. To protect the car occupant from harsh sunlight, while at the same time allowing the entry of fresh air, many vehicles have an air penetrable flexible fabric top, often referred to as a bikini top.

It is a desire of the present invention to provide an attachment arrangement and method for a bikini top for an automotive vehicle. Additionally, it is a desire of the present invention to take advantage of attachment hardware already provided in the vehicle for attachment of more permanent vehicle top enclosures.

It is a desire of the present invention to provide a bikini top for a vehicle that is connected with the vehicle frame without the use of bungee cords.

SUMMARY OF THE INVENTION

To make manifest the above delineated and other manifold positive desires, a revelation of the present invention is brought forth. In a preferred embodiment the present invention provides a freedom of an apparatus and method of utilization thereof a sunshade open air top for a vehicle which spans a portion of the vehicle from a rear weatherproof top portion of the vehicle to a windshield header of a vehicle. The top includes a first portion connected to an area of the vehicle top behind the front passenger compartment of a vehicle. A flexible fabric cover portion is provided for covering above the driver and side passenger compartment of a vehicle. The fabric cover portion has a forward edge. A magnetic portion is provided at the fore end of the fabric cover portion to allow secure releasable attachment of the sunshade to the windshield header of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a view similar to FIG. 3 of an alternate embodiment magnetic member;

FIG. 6 is a view along lines 6-6 of FIG. 5;

FIG. 7 is a view similar to FIG. 1 of an alternate embodiment of the present invention;

DETAILED DESCRIPTION OF THE PREFERRED EMBODIMENTS

Figure 1:
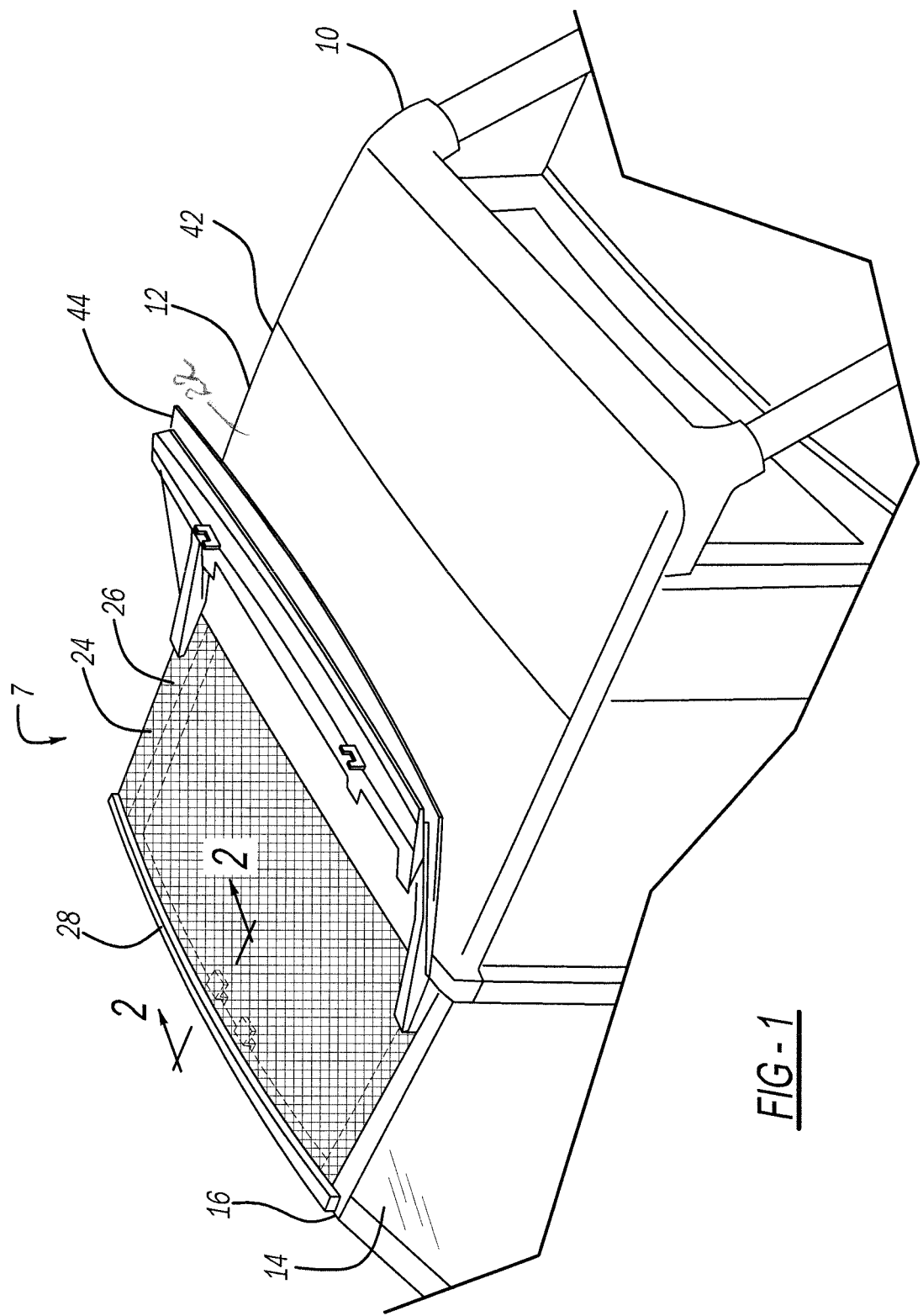
FIG. 1 is a perspective view of a vehicle arrangement according to the present invention.
Figure 2:
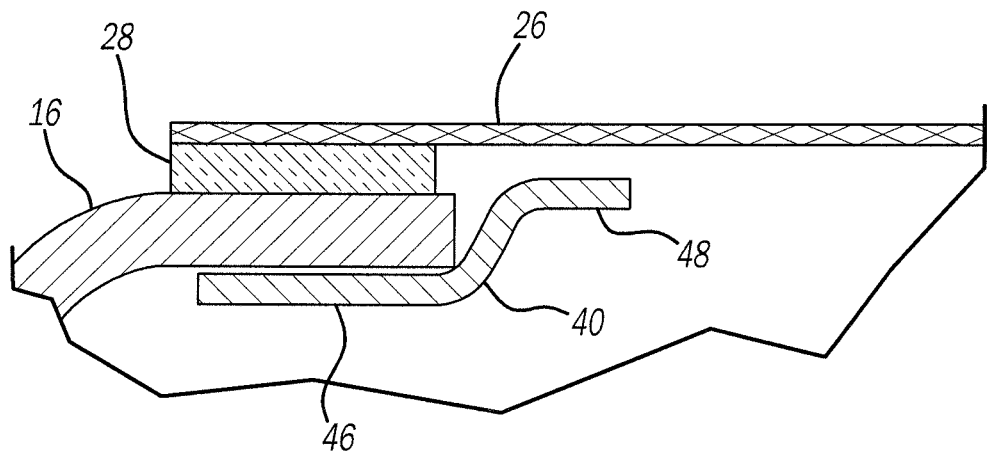
FIG. 2 is a sectional view along lines 2-2 of FIG. 1.
Figure 3:
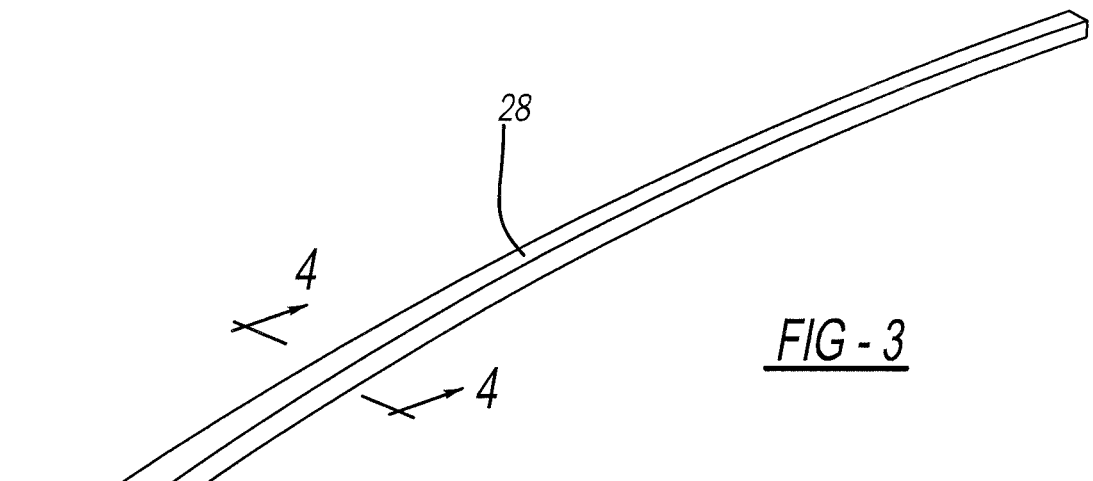
FIG. 3 is an enlarged view of a magnetic member shown in FIG. 1.
Figure 4:
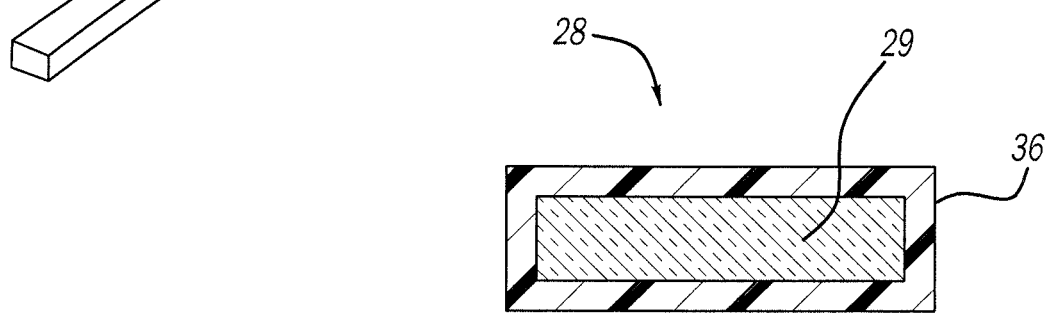
FIG. 4 is a sectional view along lines 4-4 of FIG. 3.

The following description of the preferred embodiment(s) is merely exemplary in nature and is in no way intended to limit the invention, its application, or uses.

Referring to FIGS. 1-4, a vehicle arrangement 7 of the present invention has a Jeep-type sport utility and/or all terrain type vehicle 10 with a partially open top 12 with a transverse window 14. In the embodiment shown, the transverse window 14 provides a windshield header that is adjacent a front row passenger portion of the vehicle. The window 14 has a ferromagnetic frame 16.

Over the rear seat in seating portion 22 of the vehicle is a weatherproof section top 42. A flexible fabric or mesh, preferably air-permeable membrane or cover 24 provides sun shading of a front row driver and side passenger portion of the vehicle.

The cover 24 has a fabric portion 26. Connected with an end of the fabric portion 26 of the cover is a magnetic portion or member 28. (For clarity of illustration in FIG. 1, the section of the flexible cover connected to the magnetic member 28 is not shown). The magnetic member removably connects the fabric portion to the windshield of the vehicle and tensions the fabric portion 26. The magnetic member 28 has a magnet 29 that can be a singular member or can be comprised of multiple discrete magnetic members 30 as shown in FIG. 5. The magnet portion may be fabricated by a metallic material or include the whole or partial use of a magnetic polymer such as PANiCNQ (a combination of emeraldine-based polyaniline (PANi) and tetracyanoquinodimethane (TCNQ)). In the embodiment shown in FIG. 4, magnetic member portion 28 is encapsulated in a polymeric cover 36. The cover 36 can be a singular material or a combination of materials. The encapsulating material of the polymeric cover 36 may be used to join a plurality of magnetic members 30 into a rigid structural member. The encapsulating material 36 of the polymeric cover can also be selected to aid in sealing the interface between the magnetic member and the frame 16 of the window 14. The encapsulation material can also include portions of the afore described magnetic polymers or such magnetic polymers with a more compliant outer polymer cover layer to enhance sealing.

Attached to the frame surrounding the window 14 can be a latch plate 40. The latch plate can be utilized for connecting a permanent or rigid cover over the front portion of the vehicle. The rigid cover may be a removable cover like cover section 42, that can be stored in the rear of the vehicle or may be as shown a pivotal cover 44. The latch plate has a connection portion 46 to connect to the frame directly or indirectly. The latch plate may have a connection portion 48 for connection with a top and rigid cover. To release the cover 24, a vehicle operator can just displace the magnetic member 28 from the window frame. As well known to those skilled in the art, the cover 24 may have openings (not shown) for the connecting hardware of the cover 44 to connect with the latch plate.

Figure 9:
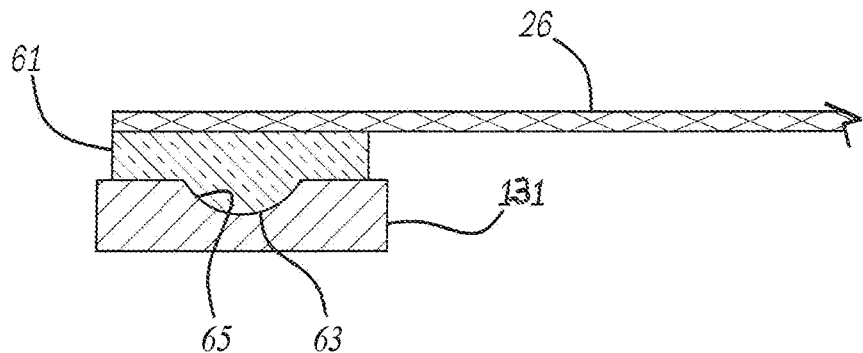
FIG. 9 is a view taken along lines 9-9 of FIG. 8.
Figure 10:
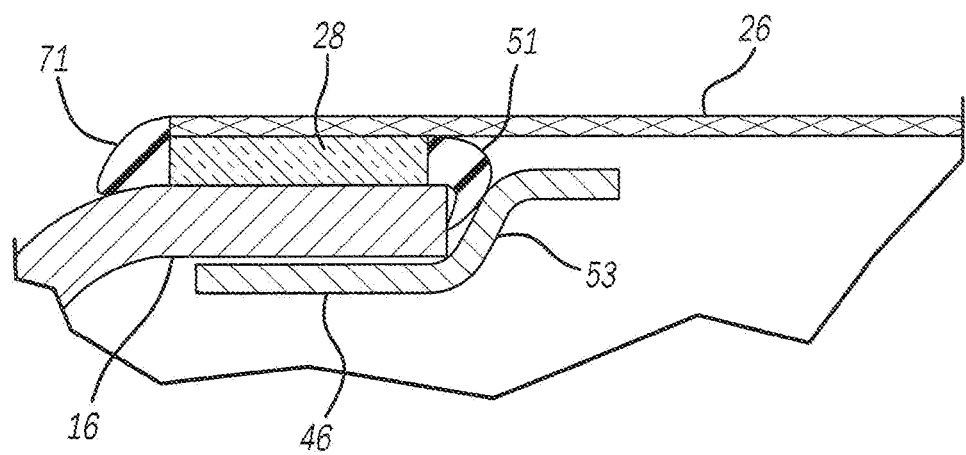
FIG. 10 is a view similar to FIG. 2 of an alternate embodiment of the present invention.

As shown in FIG. 10, a magnetic member 28 has an encapsulated tail 51. An inclined portion 53 of the latch plate acts as a stop for the magnetic member 28 in the vehicle's longitudinal direction. In another embodiment (not shown), the inclined portion is formed in almost a 90° angle with respect to connection portion 46, allowing the inclined portion to act as a longitudinal stop for the magnetic member 28 without the need for the tail 51. In still another embodiment shown in FIG. 9, a magnetic member 61 has a male member 63 engaged into female depression 65 of a longitudinal frame 131. The male/female engagement provides a stop for the magnetic member 61 in both longitudinal and transverse directions. In another embodiment (not shown), the male/female portions of the engagement between the magnetic member and the frame are reversed. The male/female engagement can be utilized on the front window frame with the pivotal cover 44 (not shown). In FIG. 10, the magnetic member has an encapsulation header 71 that serves as an air or rain shield.

Figure 8:
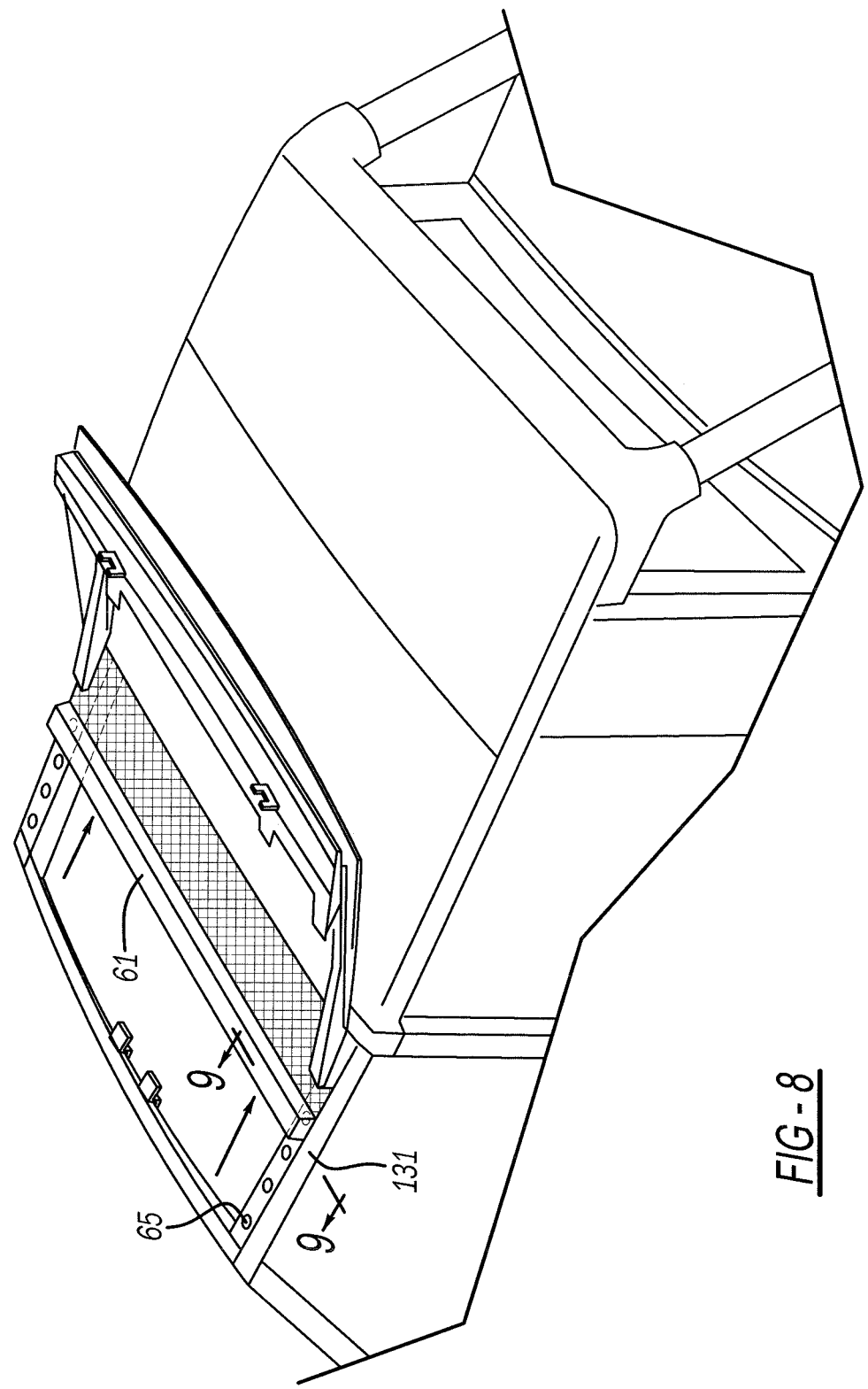
FIG. 8 is a view similar to FIG. 1 of another alternate embodiment of the present invention.

In FIG. 7, a magnetic member 128 has a rearward extension 129 that is laterally stopped by spaced-apart latch plates 40. The elongated portion of the magnetic member 128 has horizontal magnetic attractive interface with the windshield. The rearward extension has vertical magnetic attractive interface with the latch plates 40. A longitudinal window frame 131 has a series of female depressions 65 to allow for multiple fore and aft positions of the fabric portion of the cover (FIG. 8).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sunshade for a vehicle top, said vehicle top spans a portion of the vehicle from a rear weatherproof top portion to a front portion with an opening over a front passenger compartment, said opening extending to a windshield header of the vehicle, the sunshade comprising:
    an air penetrable flexible membrane cover portion for covering above the opening over the front passenger compartment of the vehicle, said membrane cover portion having a forward edge; and
    at least one magnetic portion at the forward edge of the membrane cover portion for providing secure releasable attachment of the sunshade to the windshield header of the vehicle said magnetic portion being supported in an elongated transverse rigid structural member, said magnetic portion having a spherical male/female magnetic force interface engagement with said windshield header.

2. The sunshade of claim 1 further comprising said windshield header having a longitudinally extending latch plate wherein said magnetic portion is configured to engage said latch plate.

3. The sunshade of claim 1 wherein said membrane cover portion is a mesh-like material.

4. The sunshade of claim 2 wherein said magnetic portion includes a first portion for connecting and engaging said windshield header substantially vertically along said spherical male/female interface and a second portion for horizontally engaging said latch plate along a vertical interface.

5. The sunshade of claim 1 wherein said magnetic portion is at least partially fabricated with a magnetic polymer.

6. A vehicle arrangement comprising:
    a vehicle body with a front transverse window with a ferromagnetic frame header and a front passenger compartment;
    a top with a rear weatherproof portion and a front portion with an opening over the front passenger compartment, said opening extending to the windshield header of the vehicle an air penetrable flexible membrane cover portion for covering above the opening over the front passenger compartment of the vehicle, said membrane cover portion having a forward edge; and
    at least one magnetic portion at the forward edge of the membrane cover portion for providing secure releasable attachment of the sunshade to the windshield header of the vehicle said magnetic portion being supported in an elongated transverse rigid structural member, said magnetic portion having a spherical male/female magnetic force interface engagement with said windshield header.

7. A vehicle arrangement as described in claim, 6 wherein said magnetic portion tensions said flexible member.

8. A vehicle arrangement as described in claim 6, wherein the arrangement has a latch plate fixed with respect to said frame for a rigid top and the latch plate acts as a stop for said magnetic portion in the longitudinal direction.

9. A vehicle arrangement as described in claim 8, wherein an interface between the magnetic portion and said latch plate acts as a stop in a transverse vehicle direction.

10. A vehicle arrangement as described in claim 9 with a plurality of latch plates acting as stops in a transverse vehicle direction.

11. A vehicle arrangement as described in claim 6, wherein said magnetic portion has a plurality of discrete magnets.

12. A vehicle arrangement as described in claim 6, wherein said magnetic portion has a magnet embedded in a non-magnetic material.

13. A vehicle arrangement as described in claim 6, wherein magnetic member is connected with a sealing material to seal an interface between said magnetic portion and said window frame.

14. A vehicle arrangement as described in claim 6, wherein said magnetic portion can be moved longitudinally on the vehicle to a plurality of positions.

15. A vehicle arrangement as described in claim 6, wherein the vehicle is a sport utility-type vehicle.

* * * * *